United States Patent
Yamada et al.

(10) Patent No.: US 9,544,415 B2
(45) Date of Patent: Jan. 10, 2017

(54) MOBILE ELECTRONIC DEVICE, POSITION CHECKING METHOD, POSITION CHECKING PROGRAM, AND POSITION CHECKING SYSTEM

(71) Applicant: KYOCERA CORPORATION, Kyoto-shi, Kyoto (JP)

(72) Inventors: Hidekatsu Yamada, Yokohama (JP); Junichi Kondou, Yokohama (JP); Junya Yano, Yokohama (JP); Yoshitaka Tokuyama, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 14/407,695

(22) PCT Filed: Jun. 13, 2013

(86) PCT No.: PCT/JP2013/066343
§ 371 (c)(1),
(2) Date: Dec. 12, 2014

(87) PCT Pub. No.: WO2013/187471
PCT Pub. Date: Dec. 19, 2013

(65) Prior Publication Data
US 2015/0181012 A1    Jun. 25, 2015

(30) Foreign Application Priority Data
Jun. 13, 2012 (JP) .................... 2012-134126

(51) Int. Cl.
*H04W 24/00* (2009.01)
*H04M 1/725* (2006.01)
(Continued)

(52) U.S. Cl.
CPC .......... *H04M 1/7253* (2013.01); *G08B 21/025* (2013.01); *G08B 21/0258* (2013.01); *H04M 1/72536* (2013.01); *H04W 4/008* (2013.01)

(58) Field of Classification Search
None
See application file for complete search history.

(56) References Cited

U.S. PATENT DOCUMENTS

| 7,580,724 B2 | 8/2009 | Ueda |
| 2007/0018792 A1 | 1/2007 | Taki et al. |

(Continued)

FOREIGN PATENT DOCUMENTS

| JP | 2000-215374 A | 8/2000 |
| JP | 2004-362439 A | 12/2004 |

(Continued)

OTHER PUBLICATIONS

International Search Report mailed Jul. 16, 2013, in corresponding International Application No. PCT/JP2013/066343.

(Continued)

*Primary Examiner* — Adolf Dsouza
(74) *Attorney, Agent, or Firm* — Hauptman Ham, LLP

(57) ABSTRACT

A mobile electronic device includes: a communication unit configured to perform short-distance communication with a first device, a notification unit configured to perform a local notification for a user of the mobile electronic device, and a controller configured to cause the notification unit to perform the local notification to the user when the short-distance communication with the first device is incapable of being performed. When the short-distance communication between the mobile electronic device and the first device is incapable of being performed, the controller is configured to transmit, to a second device, an inquiry as to whether the short-distance communication between the first device and the second device is capable of being performed.

8 Claims, 14 Drawing Sheets

(51) Int. Cl.
*G08B 21/02* (2006.01)
*H04W 4/00* (2009.01)

(56) References Cited

U.S. PATENT DOCUMENTS

| | | | | |
|---|---|---|---|---|
| 2010/0062763 | A1* | 3/2010 | Sato | H04W 8/183 455/432.3 |
| 2010/0173623 | A1* | 7/2010 | Takami | H04M 1/72516 455/421 |
| 2016/0119787 | A1* | 4/2016 | Kim | H04W 12/06 726/5 |

FOREIGN PATENT DOCUMENTS

| | | | |
|---|---|---|---|
| JP | 2005-85186 | A | 3/2005 |
| JP | 2005-304002 | A | 10/2005 |
| JP | 2005-318553 | A | 11/2005 |
| JP | 2006-171970 | A | 6/2006 |
| JP | 2007-150904 | A | 6/2007 |
| JP | 2008-77477 | A | 4/2008 |
| JP | 2008-160509 | A | 7/2008 |
| JP | 2008-193475 | A | 8/2008 |
| JP | 2008-299529 | A | 12/2008 |
| JP | 2010-041626 | A | 2/2010 |
| JP | 2010-161657 | A | 7/2010 |
| JP | 2012-3535 | A | 1/2012 |
| JP | 2012-005048 | A | 1/2012 |
| JP | 2012-080205 | A | 4/2012 |
| JP | 2012-5048 | * | 5/2012 |

OTHER PUBLICATIONS

Office Action in JP Application No. 2012-134126, mailed Feb. 23, 2016, for which an explanation of relevance is attached.
Office Action in JP Application No. 2012-134126, dated Sep. 27, 2016, for which an explanation of relevance is attached.

* cited by examiner

MOBILE ELECTRONIC DEVICE, POSITION CHECKING METHOD, POSITION CHECKING PROGRAM, AND POSITION CHECKING SYSTEM

CROSS-REFERENCE TO RELATED APPLICATIONS

The present application is a National Phase of International Application Number PCT/JP2013/066343 filed on Jun. 13, 2013, and claims the benefit of priority from Japanese Patent Application No. 2012-134126 filed on Jun. 13, 2012.

FIELD

The present application relates to a mobile electronic device, a position checking method, a position checking program, and a position checking system.

BACKGROUND

In recent years, some of mobile electronic devices such as mobile phones and smartphones have a function to acquire information about their own positions. From a viewpoint of ensuring children's safety, a service that provides a current position of a child in response to a request from one of his or her parents is also being pervaded, for example (refer to Patent Literature 1).

Patent Literature 1 discloses a system in which a position information service center receives current position information identified by a GPS receiver mounted on a terminal held by a child and responds the current position information about the child in reply to an inquiry from a mobile phone held by the parent.

CITATION LIST

Patent Literature

Patent Literature 1: Japanese Patent Application Laid-open No. 2006-171970

Technical Problem

When being separated from the child in crowds, it is very difficult for the parent to find the child. Even if a service that provides the current position of the child is used, situations may occur in which the current position of the child cannot be promptly checked due to a status of a network because the current position information about the child is transmitted via the network such as a mobile phone line.

For the forgoing reasons, there is a need for a mobile electronic device, a position checking method, a position checking program, and a position checking system that make it possible for a user to promptly check the position of the child.

SUMMARY

According to one of some aspects, a mobile electronic device includes: a communication unit configured to perform short-distance communication with a first device; and a controller configured to perform notification to a user when the short-distance communication with the first device is incapable of being performed.

According to one of some aspects, a position checking method is implemented by an electronic device including a communication unit. The position checking method includes: performing short-distance communication with a first device by the communication unit; and performing notification to a user when the short-distance communication with the first device is incapable of being performed.

According to one of some aspects, a position checking program causes an electronic device including a communication unit to execute: performing short-distance communication with a first device by the communication unit; and performing notification to a user when the short-distance communication with the first device is incapable of being performed.

According to one of some aspects, a position checking system includes: a first device; a second device; a third device; and a base station. The first device is configured to transmit, to the second device through communication via the base station or short-distance communication, an inquiry as to whether short-distance communication between the second device and the third device is capable of being performed when the short-distance communication between the first device and the third device is incapable of being performed, and transmit, to the second device through communication via the base station or short-distance communication, a reply whether the short-distance communication between the first device and the third device is capable of being performed when receiving an inquiry as to whether the short-distance communication between the first device and the third device is capable of being performed from the second device. The second device is configured to transmit, to the first device through communication via the base station or short-distance communication, an inquiry as to whether short-distance communication between the first device and the third device is capable of being performed when the short-distance communication between the second device and the third device is incapable of being performed, and transmit, to the first device through communication via the base station or short-distance communication, a reply whether the short-distance communication between the second device and the third device is capable of being performed when receiving an inquiry as to whether the short-distance communication between the second device and the third device is capable of being performed from the first device.

DESCRIPTION OF EMBODIMENTS

Some exemplary embodiments of the present invention will be explained in detail below with reference to the accompanying drawings. Mobile phones will be explained below as examples of a mobile electronic device.

First Embodiment

Figure 1:
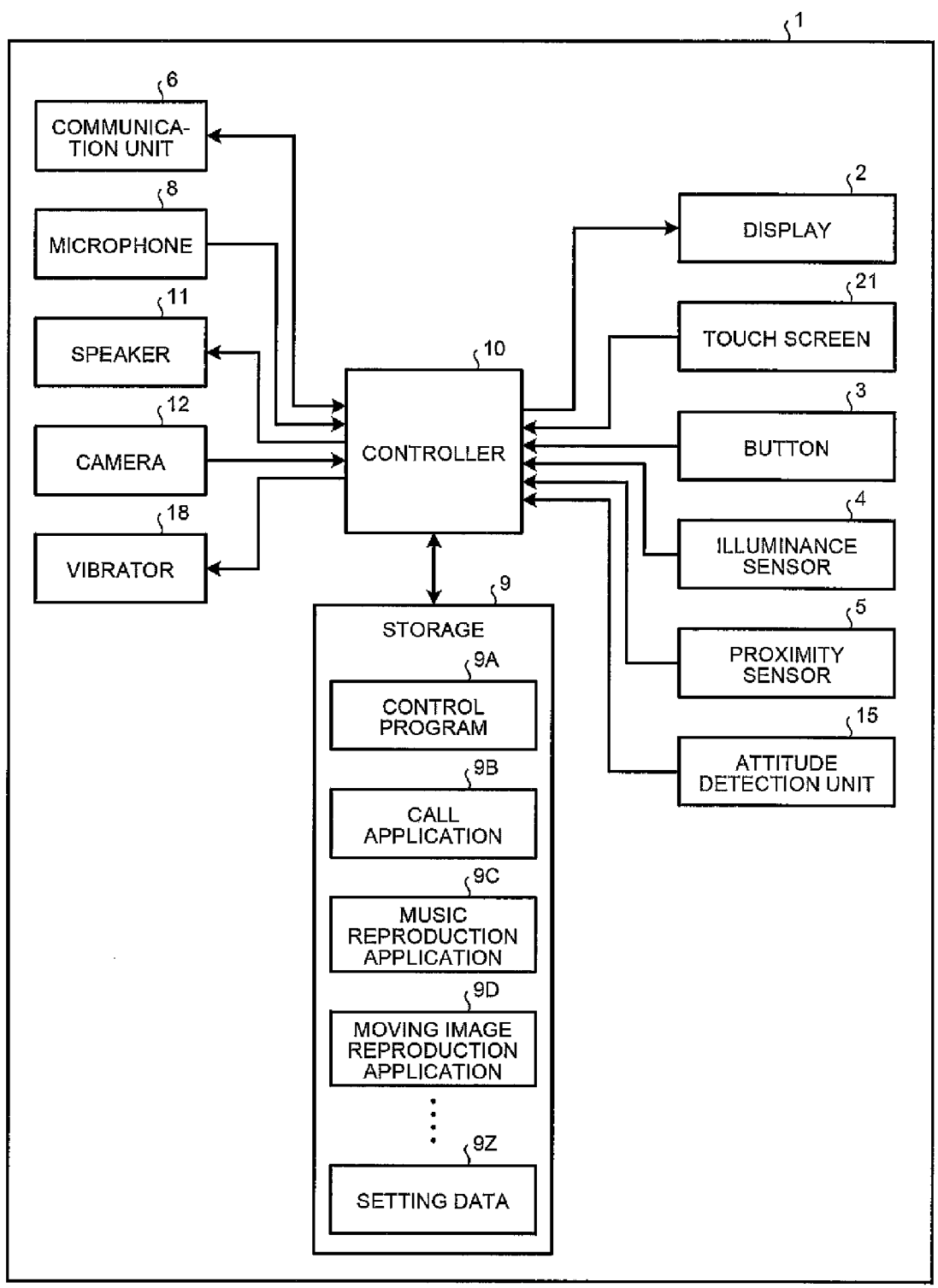
FIG. 1 is a block diagram of a mobile phone according to a first embodiment.

With reference to FIG. 1, the following describes a functional structure of a mobile phone 1 according to a first embodiment. FIG. 1 is a block diagram of the mobile phone 1. As illustrated in FIG. 1, the mobile phone 1 includes a display 2, a button 3, an illuminance sensor 4, a proximity sensor 5, a communication unit 6, a microphone 8, a storage 9, a controller 10, a speaker 11, a camera 12, an attitude detection unit 15, a vibrator 18, and a touch screen 21.

The display 2 is provided with a display device such as a liquid crystal display (LCD), an organic electro-luminescence display (OELD), or an inorganic electro-luminescence display (IELD). The display 2 displays text, images, symbols, graphics, and the like.

The button 3 accepts an operation input by a user. The number of the button 3 may be single or plural.

The illuminance sensor 4 detects illuminance of the ambient light of the mobile phone 1. The illuminance indicates intensity of light, lightness, or brightness. The illuminance sensor 4 is used, for example, to adjust the brightness of the display 2.

The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects that, for example, the display 2 is brought close to someone's face. The illuminance sensor 4 and the proximity sensor 5 may be configured as one sensor. The illuminance sensor 4 can be used as a proximity sensor.

The communication unit 6 communicates wirelessly. A communication system supported by the communication unit 6 is wireless communication standard. The wireless communication standard includes, for example, a communication standard of cellular phones such as 2G, 3G, and 4G. The communication standard of cellular phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handyphone System (PHS). The wireless communication standard further includes, for example, Worldwide Interoperability for Microwave Access (WiMAX), IEEE 802.11, Bluetooth, Infrared Data Association (IrDA), and Near Field Communication (NFC), and Wireless Personal Area network (WPAN). WPAN includes, for example, ZigBee. The communication unit 6 may support one or more communication standards.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2 and perform a process according to a gesture detected through the touch screen 21. The control program is, for example, an OS. The applications and the control program may be installed in the storage 9 through wireless communication by the communication unit 6 or through a non-transitory storage medium.

The storage 9 stores therein a control program 9A, a call application 9B, a music reproduction application 9C, a moving image reproduction application 9D, and setting data 9Z, for example. The call application 9B provides a call function for making calls by wireless communication. The music reproduction application 9C provides a music reproduction function for reproducing sounds from music data. The moving image reproduction application 9D provides a moving image reproduction function for reproducing moving images and sounds from moving image data. The setting data 9Z includes information about various settings and various types of processing related to the operation of the mobile phone 1. For example, the setting data 9Z includes identification information that can uniquely identify the mobile phone 1 such as an individual recognition number of the mobile phone 1.

The control program 9A provides functions about various types of control for operating the mobile phone 1. The control program 9A achieves making calls by controlling the communication unit 6, the microphone 8, and the like, for example. The control program 9A achieves short-range communication by controlling the communication unit 6 and the like. For the short-distance communication, there is a wireless communication standard that allows the connection to another device without a public communication network, for example. In such short-distance communication, the mobile phone 1 performs communication directly and wirelessly with another device. Examples of the short-distance communication include IEEE802.11, Bluetooth, Infrared Data Association (IrDA), Near Field Communication (NFC), and Wireless Personal Area Network (WPAN). The control program 9A achieves a search for another device present in a communication area of the short-distance communication by controlling the communication unit 6 and the like. The functions provided by the control program 9A may be used by being combined with functions provided by another program such as the call application 9B in some cases.

The control program 9A includes a function to perform notification to a user when the short-distance communication with a first device is incapable of being performed. For example, when the first device is not detected in the communication area of the short-distance communication, the control program 9A determines that the short-distance communication with the first device is incapable of being performed.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the mobile phone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2, the communication unit 6, the microphone 8, the speaker 11, and the vibrator 18. The controller 10 can change the control according to the detection result of a detector. Examples of the detectors include, but are not limited to, the button 3, the illuminance sensor 4, the proximity sensor 5, the microphone 8, the camera 12, the attitude detection unit 15, and the touch screen 21.

The controller 10 executes the control program 9A to control the communication unit 6 and the like, thereby searching for another device present in the communication area of the short-distance communication, for example. When the short-distance communication with the first device is incapable of being performed as a result of the search, the controller 10 performs the notification to a user.

In the present application, examples of activating a computer program (application) by the controller 10 include: reading newly the computer program stored in the storage 9 and starting newly the process thereof; and starting newly the process of a computer program that has already been read. In the present application, examples of executing a computer program by the controller 10 include: activating the computer program; resuming the computer program that is currently suspended; and continuing the process of the computer program that is active.

Part or all of the programs and the data stored in the storage 9 in FIG. 1 may be downloaded from any other device through wireless communication by the communication unit 6. Part or all of the programs and the data stored in the storage 9 in FIG. 1 may be stored in the non-transitory storage medium that can be read by the reader included in the storage 9. Examples of the non-transitory storage mediums include, but are not limited to, an optical disc such as CD, DVD, and Blu-ray, a magneto-optical disc, magnetic storage medium, a memory card, and solid-state storage medium.

The microphone 8 is a sound input unit. The microphone 8 converts input sounds to electric signals. The speaker 11 is a sound output unit that outputs sounds by air conduction method. The speaker is a dynamic speaker, for example, which transmits sounds converted from electric signals even to a person who does not bring his or her ear in contact with the mobile phone 1. The speaker 22 is used to output sounds of a telephone call, or sounds of music contents or moving image contents, for example.

The camera 12 is an in-camera for photographing an object facing the display 2. The camera 12 converts a photographed image to electric signals. The mobile phone 1 may include an out camera for photographing an object facing the other side of the display 2 as well as the camera 12.

The attitude detection unit 12 detects attitude of the mobile phone 1. The attitude detection unit 12 includes at least one of an acceleration sensor, direction sensor, and gyroscope to detect the attitude.

The vibrator 18 vibrates part or the whole of the mobile phone 1. The vibrator includes a piezoelectric element, an eccentric motor, or the like to generate vibration, for example. The vibration generated by the vibrator 18 is used not to transmit sounds but to notify a user of a various type of events such as an incoming call.

The touch screen 21 detects contact with the touch screen 21. The touch screen is used to detect a contact operation by a user with a finger, a pen, a stylus pen, or the like. Examples of the gesture detected via the touch screen 21 include, but are not limited to, a touch, a long touch, a release, a swipe, a tap, a double-tap, a long tap, a drag, a flick, a pinch-in, and a pinch-out. Any technology such as capacitive sensing, resistive sensing, surface acoustic wave (SAW) (or ultrasonic) sensing, infrared sensing, electromagnetic induction sensing, and load sensing, may be used to allow the touch screen 21 to detect contact.

The functional structure of the mobile phone 1 illustrated in FIG. 1 is one of some examples, and therefore it can be modified as required within a scope that does not depart from the gist of the present invention. For example, the mobile phone 1 may be provided with the attitude detection unit and the touch screen 21.

Figure 2:
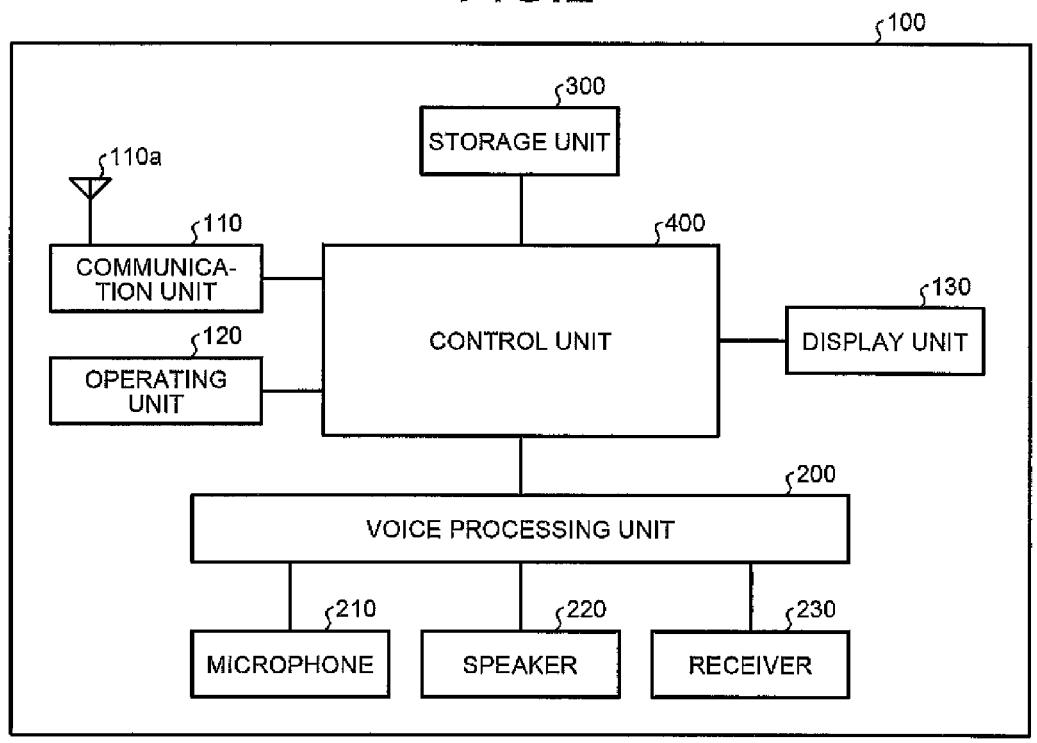
FIG. 2 is a block diagram of another mobile phone according to the first embodiment.

With reference to FIG. 2, the following describes a functional structure of a mobile phone 100 according to the first embodiment. FIG. 2 is a block diagram of another mobile phone according to the first embodiment. As illustrated in FIG. 2, the mobile phone 100 includes a communication unit 110, an operating unit 120, a display unit 130, a voice processing unit 200, a storage unit 300, and a control unit 400.

The communication unit 110 performs communication via radio waves. A communication system supported by the communication unit 110 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC), and Wireless Personal Area network (WPAN). WPAN includes, for example, ZigBee.

The communication unit 110 has an antenna 110a, for example. The communication unit 110 establishes a wireless communication path with a base station via a channel allocated by the base station. The communication unit 110 performs telephone communication and information communication with, for example, the mobile phone 1 via the base station. The communication unit 110 receives radio signals in a certain frequency range from GPS satellites. The communication unit 110 demodulates the received radio signals and outputs the processed signals to the control unit 400. The mobile phone 100 may be provided with a communication unit that receives only radio signals from the GPS satellites separately from the communication unit 110.

The operating unit 120 has a plurality of keys provided with functions such as numeric keys, cursor keys, an enter key, and a transmitting key, for example. When key input is performed with those keys by the user's operation, the operating unit 120 generates signals corresponding to the operation. The generated signals are input to the control unit 400 as the user's instruction.

The display unit 130 has a display or a monitor, for example. The display unit 130 causes a display panel to display video according to video data and an image according to image data supplied from the control unit 400.

The voice processing unit 200 performs processing on voice signals input to a microphone 210 and the voice signals output from a speaker 220 and a receiver 230.

The storage unit 300 stores therein various programs and various types of data used for the processing in the control unit 400. In this one of some embodiments, the storage unit 300 stores therein at least a measurement program that performs processing to measure a position on the basis of the radio signals from the GPS satellites, and a transmitting program that performs processing to transmit the measured positional information to the mobile phone 1. The transmitting program is used for the processing in the control unit 400 when a request for transmitting the positional information is received from the mobile phone 1.

The control unit 400 performs processing on the basis of the various programs stored in the storage unit 300. The control unit 400 is constituted of a microprocessor unit, for example. The control unit 400 sequentially reads operation codes from the programs stored in the storage unit 300 and causes the mobile phone 100 to perform various types of processing in accordance with the procedures instructed by the read operation codes.

For example, when receiving the request for transmitting the positional information from the mobile phone 1 via the communication unit 110, the control unit 400 executes the measurement program and the transmitting program, and transmits the measured positional information to the mobile phone 1 via the communication unit 110.

Figure 3:
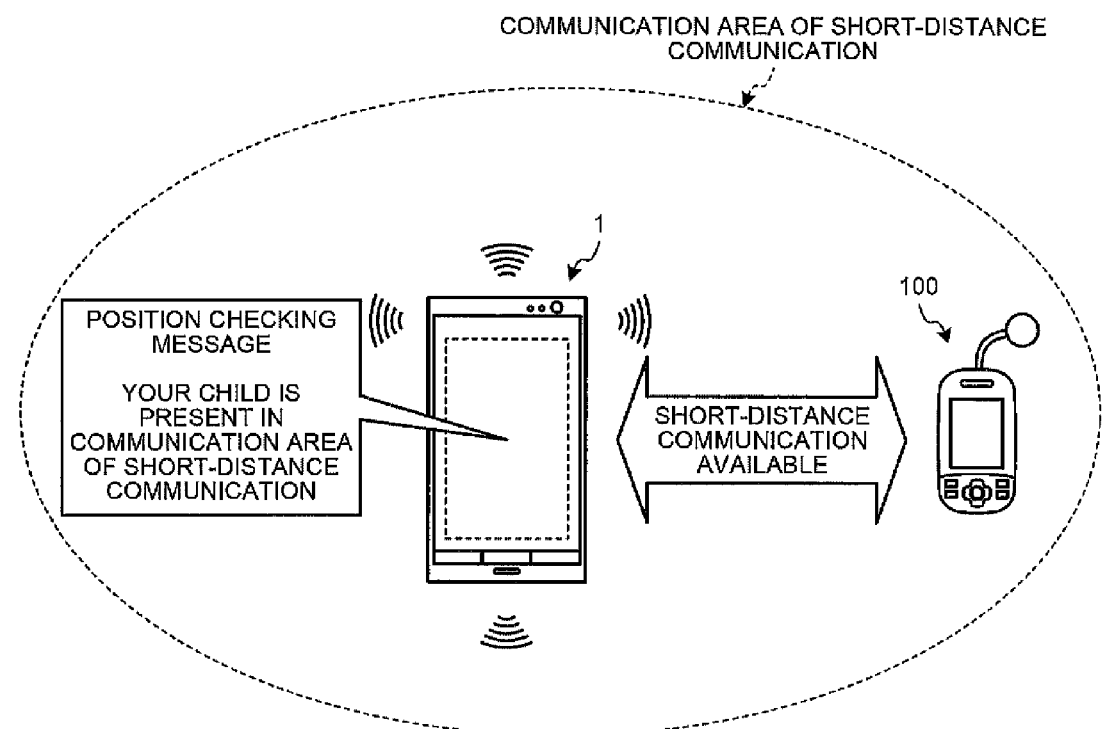
FIG. 3 is a schematic diagram illustrating an overview of processing according to the first embodiment.
Figure 4:
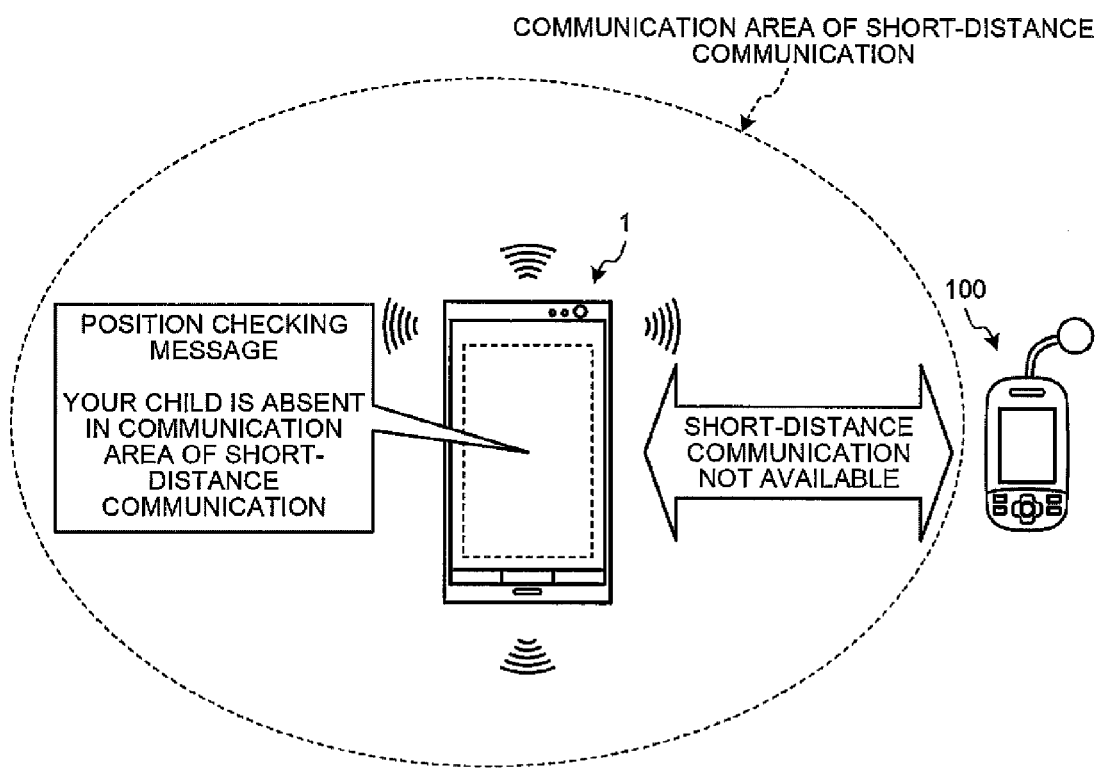
FIG. 4 is a schematic diagram illustrating an overview of the processing according to the first embodiment.

With reference to FIGS. 3 and 4, the following describes an overview of the processing performed by the mobile phone 1. FIGS. 3 and 4 are schematic diagrams illustrating an overview of the processing according to the first embodiment. The following describes one of some examples where a parent uses the mobile phone 1 while the child uses the mobile phone 100.

As illustrated in FIG. 3, the mobile phone 1 searches for another device present in the communication area of the short-distance communication by controlling the communication unit 6 and the like. When detecting the mobile phone 100 in the communication area of the short-distance communication as a result of the search, the mobile phone 1 notifies a user of the detection. For example, the mobile phone 1 displays a position checking message describing that "your child is present in communication area of short-distance communication" on the display 2, as illustrated in FIG. 3.

As illustrated in FIG. 4, the mobile phone 1 searches for another device present in the communication area of the short-distance communication by controlling the communication unit 6 and the like. When not detecting the mobile phone 100 in the communication area of the short-distance communication as a result of the search, the mobile phone 1 notifies a user of no detection. For example, the mobile phone 1 displays a position checking message describing that "your child is absent in communication area of short-distance communication" on the display 2, as illustrated in FIG. 4.

Figure 5:
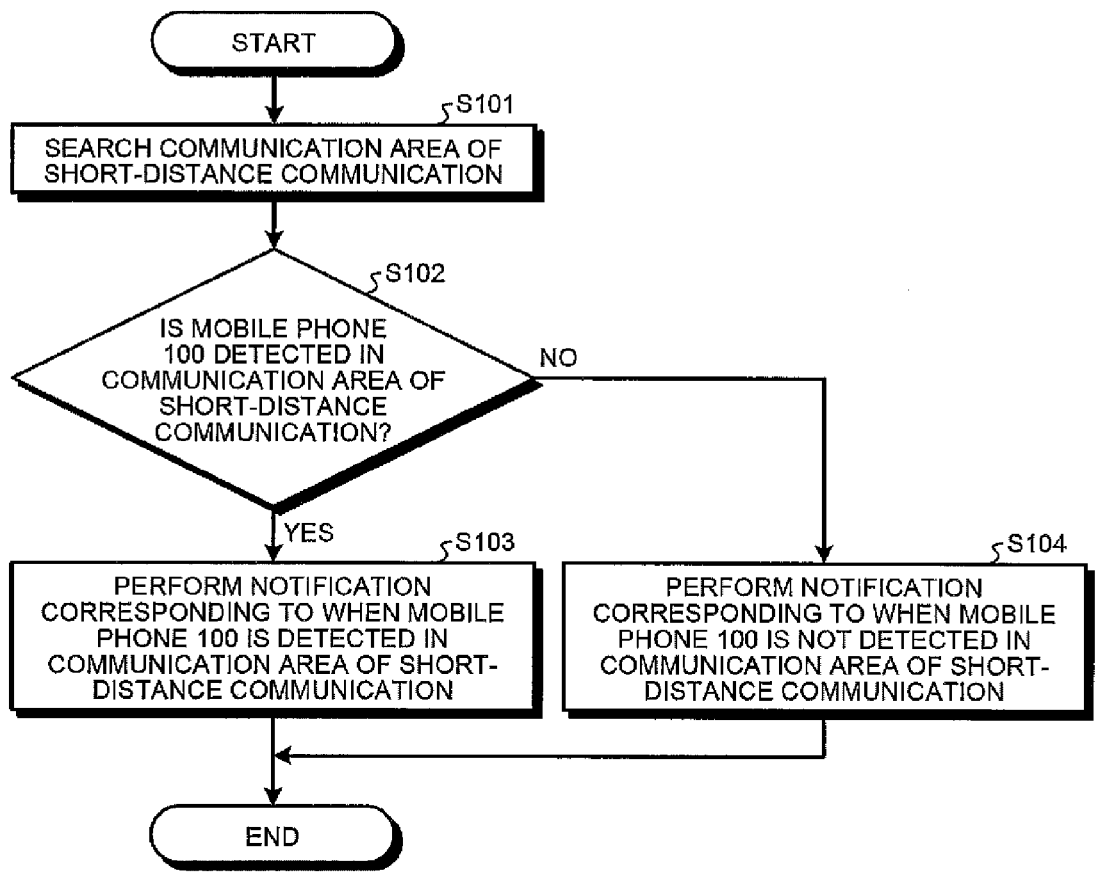
FIG. 5 is a schematic diagram illustrating one of some examples of a procedure of the processing by the mobile phone according to the first embodiment.

With reference to FIG. 5, the following describes one of some examples of the processing procedure corresponding to FIGS. 3 and 4. FIG. 5 is a schematic diagram illustrating one of some examples of the procedure of the processing by the mobile phone according to the first embodiment. The processing procedure illustrated in FIG. 5 is achieved by the controller 10 executing the control program 9A and the like stored in the storage 9.

As illustrated in FIG. 5, the controller 10 searches the communication area of the short-distance communication at Step S101. In the other words, the controller 10 searches for another device present in the communication area of the short-distance communication. Subsequently, the controller 10 determines whether the mobile phone 100 is detected in the communication area of the short-distance communication at Step S102.

When detecting the mobile phone 100 in the communication area of the short-distance communication as a result of the determination (Yes at Step S102), then at Step S103, the controller 10 performs the notification corresponding to when the mobile phone 100 is detected in the communication area of the short-distance communication. For example, the controller 10 displays the position checking message describing that "your child is present in communication area of short-distance communication" on the display 2 (refer to FIG. 3).

When not detecting the mobile phone 100 in the communication area of the short-distance communication as a result of the determination (No at Step S102), then at Step S104, the controller 10 performs the notification corresponding to when the mobile phone 100 is not detected in the communication area of the short-distance communication. For example, the controller 10 displays the position checking message describing that "your child is absent in communication area of short-distance communication" on the display 2 (refer to FIG. 4).

In the processing procedure illustrated in FIG. 5, the controller 10 may search for another device present in the communication area of the short-distance communication with a certain polling period, or may consistently search for another device present in the communication area of the short-distance communication if there is no uncertainty about power consumption, for example.

In the first embodiment, the mobile phone 1 performs the notification corresponding to when the mobile phone 100 is not detected in the communication area of the short-distance communication at least when not detecting the mobile phone 100 in the communication area of the short-distance communication. For example, the mobile phone 1 displays the position checking message indicating that the mobile phone 100 held by the child is absent in the communication area of the short-distance communication (refer to FIG. 4). The first embodiment thus makes it possible for the parent to promptly know that the child is absent at least in the communication area of the short-distance communication. That is, in the first embodiment, the mobile phone 1 makes it possible to allow a user to promptly check the position of the child.

In the first embodiment, the mobile phone 1 performs the notification corresponding to when the mobile phone 100 is detected in the communication area of the short-distance communication when detecting the mobile phone 100 in the communication area of the short-distance communication. For example, the mobile phone 1 displays the position checking message indicating that the mobile phone 100 held by the child is present in the communication area of the short-distance communication (refer to FIG. 3). The first embodiment thus makes it possible for the parent to promptly know that the child is present in the communication area of the short-distance communication. That is, in the first embodiment, the mobile phone 1 makes it possible to allow a user to promptly check the position of the child when the child is also present in the communication area of the short-distance communication as well.

For example, when detecting the mobile phone 100 in the communication area of the short-distance communication, the mobile phone 1 may display the position checking message including information on a positional relation with the mobile phone 100 held by the child on the basis of information about an area in which the short-distance communication can be performed. For example, when the communication area of the short-distance communication covers a range of 100 meters, the mobile phone 1 may display the position checking message including information that the child is present within a range of 100 meters referring to the current position of the parent as a reference. Likewise, when not detecting the mobile phone 100 in the communication area of the short-distance communication, the mobile phone 1 may display the position checking message including information on a positional relation with the mobile phone 100 held by the child on the basis of information about the communication area of the short-distance communication. For example, when the communication area of the short-distance communication covers a range of 100 meters, the mobile phone 1 may display the position checking message including information that the child is absent within a range of 100 meters referring to the current position of the parent as a reference.

When detecting the mobile phone 100 in the communication area of the short-distance communication, the mobile phone 1 may calculate a distance to the mobile phone 100 on the basis of radio wave intensity received from the mobile phone 100, and display the position checking message including the distance. For example, when calculating a distance to the mobile phone 100 is 60 meters from the radio wave intensity received from the mobile phone 100, the mobile phone 1 displays the position checking message including information that the child is present within a range of 60 meters referring to the current position of the parent as a reference.

In the first embodiment, the mobile phone 1 can receive radio waves transmitted from the mobile phone 100 and acquire identification information about the mobile phone 100 when the mobile phone 100 is present in the communication area of the short-distance communication.

Second Embodiment

In the first embodiment, one of some examples is described where the position checking message (refer to FIGS. 3 and 4) is displayed as the notification corresponding to when the mobile phone 100 is detected in the communication area of the short-distance communication or when the mobile phone 100 is not detected in the communication area of the short-distance communication, for example. However, some embodiments are not limited hereto. For example, images each corresponding to when the mobile phone 100 is detected in the communication area of the short-distance communication and when the mobile phone 100 is not detected in the communication area of the short-distance communication may be respectively displayed instead of the position checking message or together with the position checking message.

Figure 6:
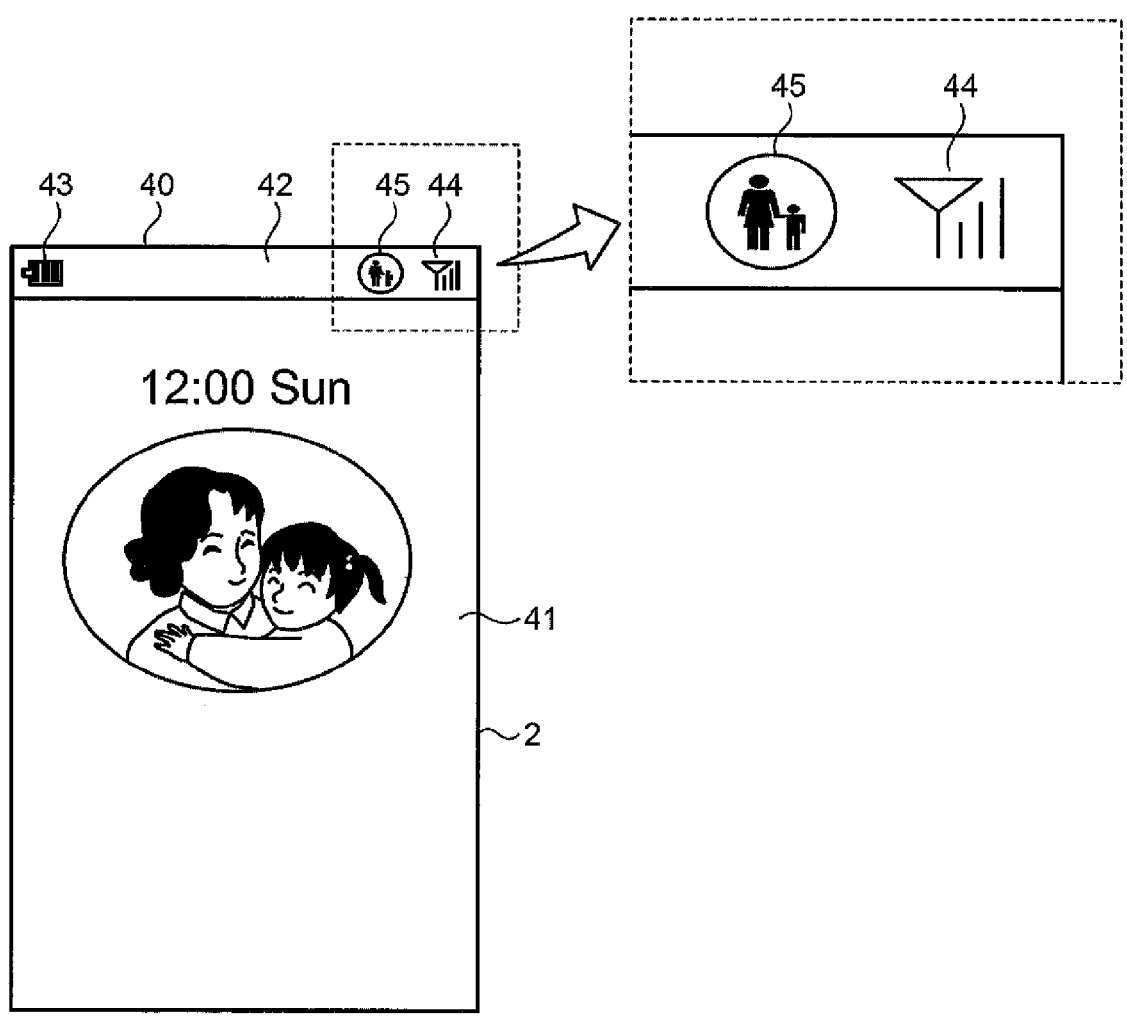
FIG. 6 is a schematic diagram illustrating one of some examples of an image corresponding to when the mobile phone is detected in a communication area of short-distance communication.
Figure 7:
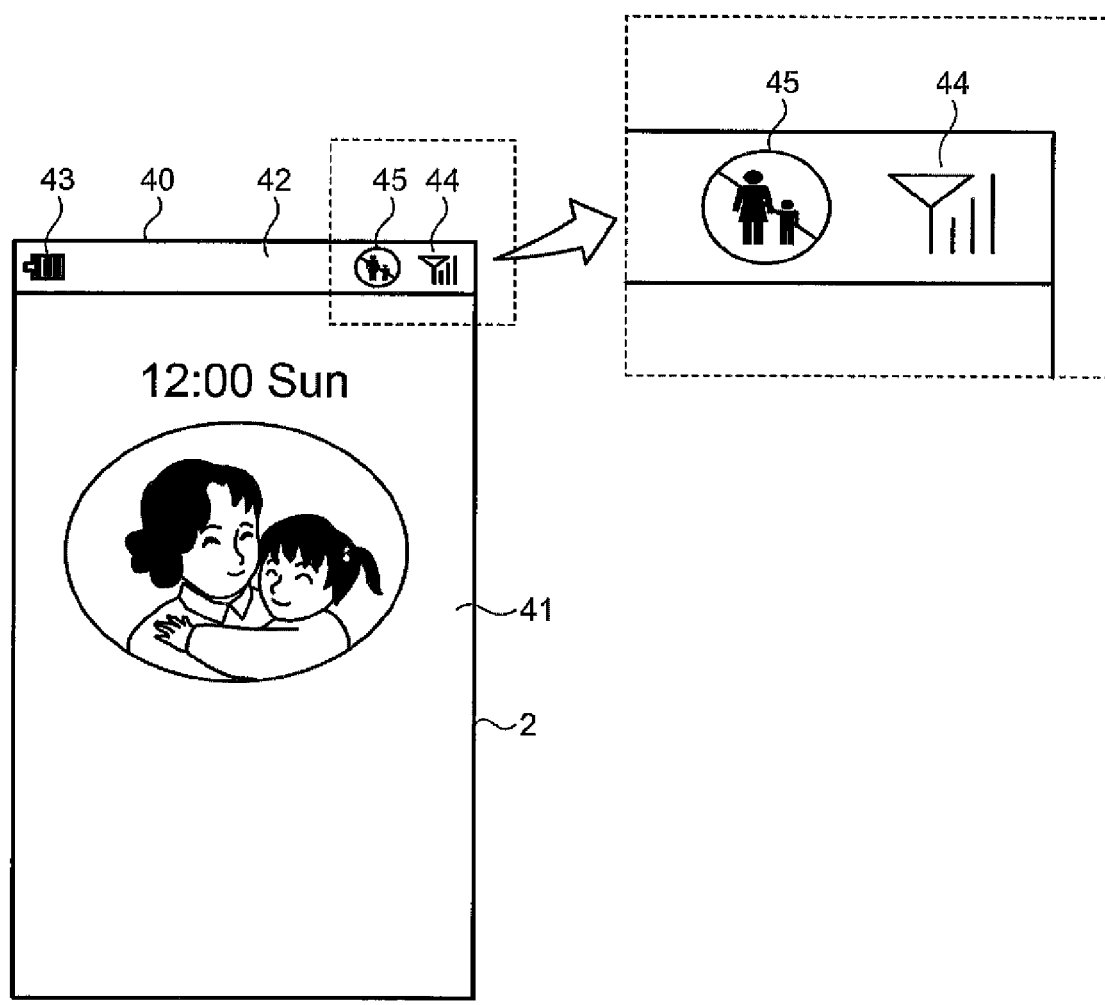
FIG. 7 is a schematic diagram illustrating one of some examples of an image corresponding to when the mobile phone is not detected in the communication area of the short-distance communication.

FIG. 6 is a schematic diagram illustrating one of some examples of an image corresponding to when the mobile phone 100 is detected in the communication area of the short-distance communication. FIG. 7 is a schematic diagram illustrating one of some examples of an image corresponding to when the mobile phone 100 is not detected in the communication area of the short-distance communication. As illustrated in FIGS. 6 and 7, an idle screen 40 is displayed on the display 2 of the mobile phone 1, for example. On the idle screen 40, wallpaper 41 is displayed. The wallpaper 41 is called a photo screen, a back screen, an idle image, or a background image in some cases. The mobile phone 1 can use any image as the wallpaper 41. The mobile phone 1 is configured to make it possible for a user to select an image to be displayed as the wallpaper 41. On the wallpaper 41, information about the day and time is displayed in an overlapping manner.

At the upper end of the display 2 illustrated in FIGS. 6 and 7, an area 42 is provided. In the area 42, a residual quantity indicator 43 that indicates the residual quantity of a power source, a radio wave level indicator (antenna pict.) 44 that indicates the electric field intensity of radio waves for communication, and a position checking indicator 45 are displayed. The position checking indicator 45 illustrated in FIG. 6 is the image corresponding to when the mobile phone 100 is detected in the communication area of the short-distance communication. The position checking indicator 45 illustrated in FIG. 7 is the image corresponding to when the mobile phone 100 is not detected in the communication area of the short-distance communication. The design of the position checking indicators 45 illustrated in FIGS. 6 and 7 are a part of some examples. Any design may be adopted that makes it possible for a user to understand the meaning of the position checking indicators 45 illustrated in FIGS. 6 and 7.

In the second embodiment, the position checking indicator 45 is displayed on the idle screen 40. This makes it possible to allow a user to promptly check the position of the child without using the display area of the display 2 for displaying the position checking message, for example.

The notifications corresponding to when the mobile phone 100 is detected in the communication area of the short-distance communication and when the mobile phone 100 is not detected in the communication area of the short-distance communication may be performed by sounds or voices instead of the position checking message (refer to FIGS. 3 and 4) described in the first embodiment and the position checking indicator 45 (refer to FIGS. 6 and 7) described in the second embodiment.

Third Embodiment

When returning from the state incapable of performing the short-distance communication with the mobile phone 100 to the state capable of performing the short-distance communication with the mobile phone 100, the mobile phone 1 may perform the notification to the user.

The control program 9A includes a function to perform the notification to the user when the mobile phone 1 returns from the state incapable of performing the short-distance communication with the mobile phone 100 to the state capable of performing the short-distance communication with the mobile phone 100 (the mobile phone 100 is detected again in the communication area of the short-distance communication).

The controller 10 executes the control program 9A, thereby performing the notification to the user when the mobile phone 1 returns from the state incapable of performing the short-distance communication with the mobile phone 100 to the state capable of performing the short-distance communication with the mobile phone 100 (the mobile phone 100 is detected again in the communication area of the short-distance communication), for example.

Figure 8:
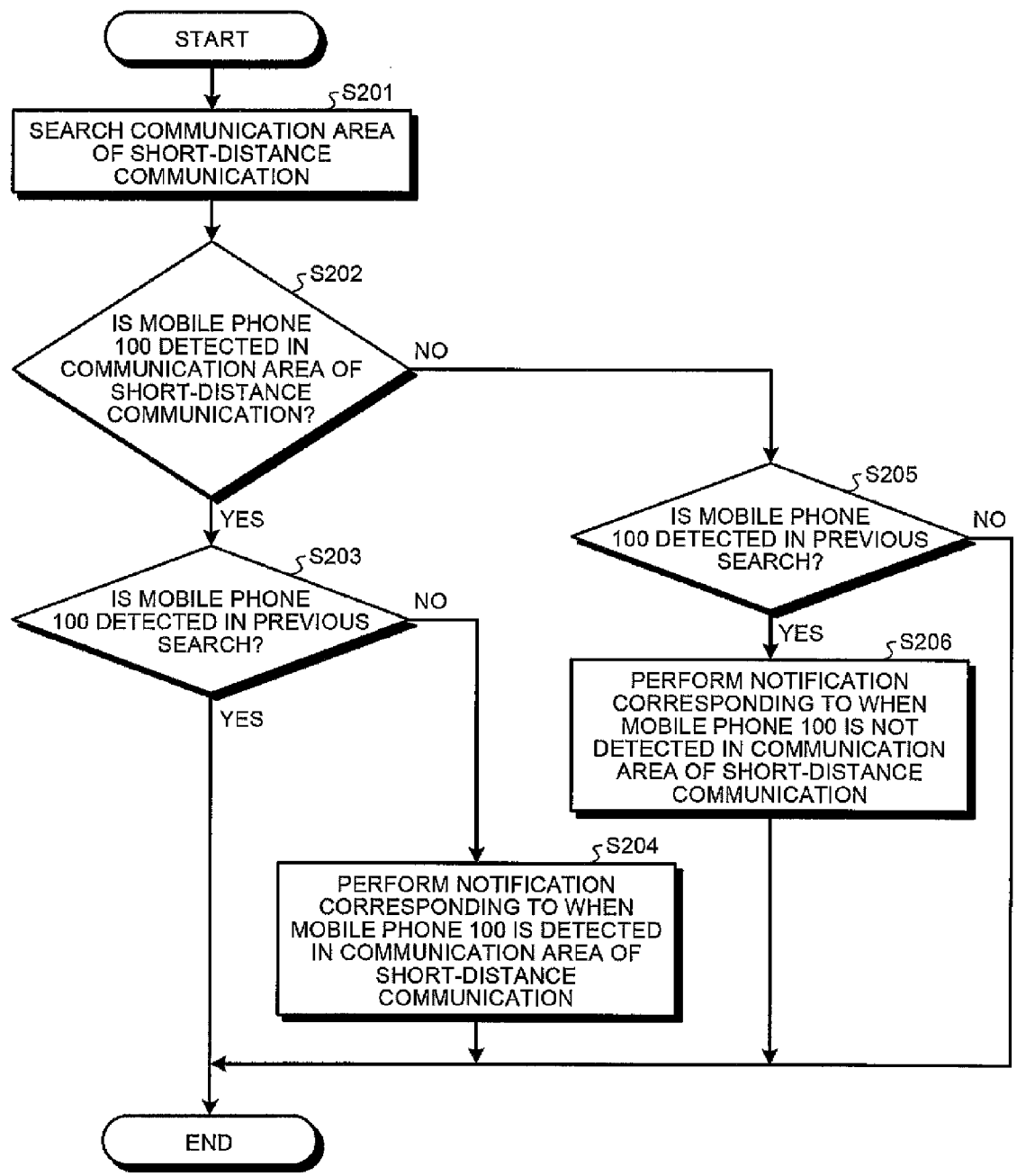
FIG. 8 is a schematic diagram illustrating one of some examples of a procedure of the processing by the mobile phone according to a third embodiment.

FIG. 8 is a schematic diagram illustrating one of some examples of the procedure of the processing by the mobile phone according to a third embodiment. The processing procedure illustrated in FIG. 8 is achieved by the controller 10 executing the control program 9A and the like stored in the storage 9.

As illustrated in FIG. 8, the controller 10 searches the communication area of the short-distance communication at Step S201. In the other words, the controller 10 searches for another device present in the communication area of the short-distance communication. Subsequently, the controller 10 determines whether the mobile phone 100 is detected in the communication area of the short-distance communication at Step S202.

When it is determined that the mobile phone 100 is detected in the communication area of the short-distance communication as a result of the determination (Yes at Step S202), then at Step S203, the controller 10 determines whether the mobile phone 100 is detected in the previous search.

When it is determined that the mobile phone 100 is detected in the previous search as a result of the determination (Yes at Step S203), the controller 10 ends the processing procedure illustrated in FIG. 8. When it is determined that the mobile phone 100 is not detected in the previous search as a result of the determination (No at Step S203), then at Step S204, the controller 10 performs the notification corresponding to when the mobile phone 100 is detected in the communication area of the short-distance communication. For example, the controller 10 displays the position checking message (refer to FIG. 3) on the display 2 or displays the position checking indicator 45 (refer to FIG. 6) on the display 2.

At Step S202, when it is determined that the mobile phone 100 is not detected in the communication area of the short-distance communication as a result of the determination (No at Step S202), then at Step S205, the controller 10 determines whether the mobile phone 100 is detected in the previous search.

When it is determined that the mobile phone 100 is detected in the previous search as a result of the determination (Yes at Step S205), then at Step S206, the controller 10 performs the notification corresponding to when the mobile phone 100 is not detected in the communication area of the short-distance communication. For example, the controller 10 displays the position checking message (refer to FIG. 4) on the display 2 or displays the position checking indicator 45 (refer to FIG. 7) on the display 2. When it is determined that the mobile phone 100 is not detected in the previous search as a result of the determination (No at Step S205), the controller 10 ends the processing procedure illustrated in FIG. 8.

In the third embodiment, at least when the mobile phone 1 returns from the state incapable of performing the short-distance communication with the mobile phone 100 to the state capable of performing the short-distance communication with the mobile phone 100, the notification to the user is performed. The third embodiment thus makes it possible for the user to promptly check that the child is present in the communication area of the short-distance communication. In the third embodiment, when the mobile phone 1 turns from the state capable of performing the short-distance communication with the mobile phone 100 into the state incapable of performing the short-distance communication with the mobile phone 100, the notification to the user is performed. The third embodiment thus makes it possible for a user to promptly check that the child is absent in the communication area of the short-distance communication.

Fourth Embodiment

In the third embodiment, the searching period of another device in the communication area of the short-distance communication may be changed in accordance with a certain condition, for example.

The control program 9A includes a function to change the searching period of another device in the communication area of the short-distance communication in accordance with a certain condition.

The controller 10 executes the control program 9A, thereby changing the searching period of another device in the communication area of the short-distance communication in accordance with a certain condition, for example.

Figure 9:
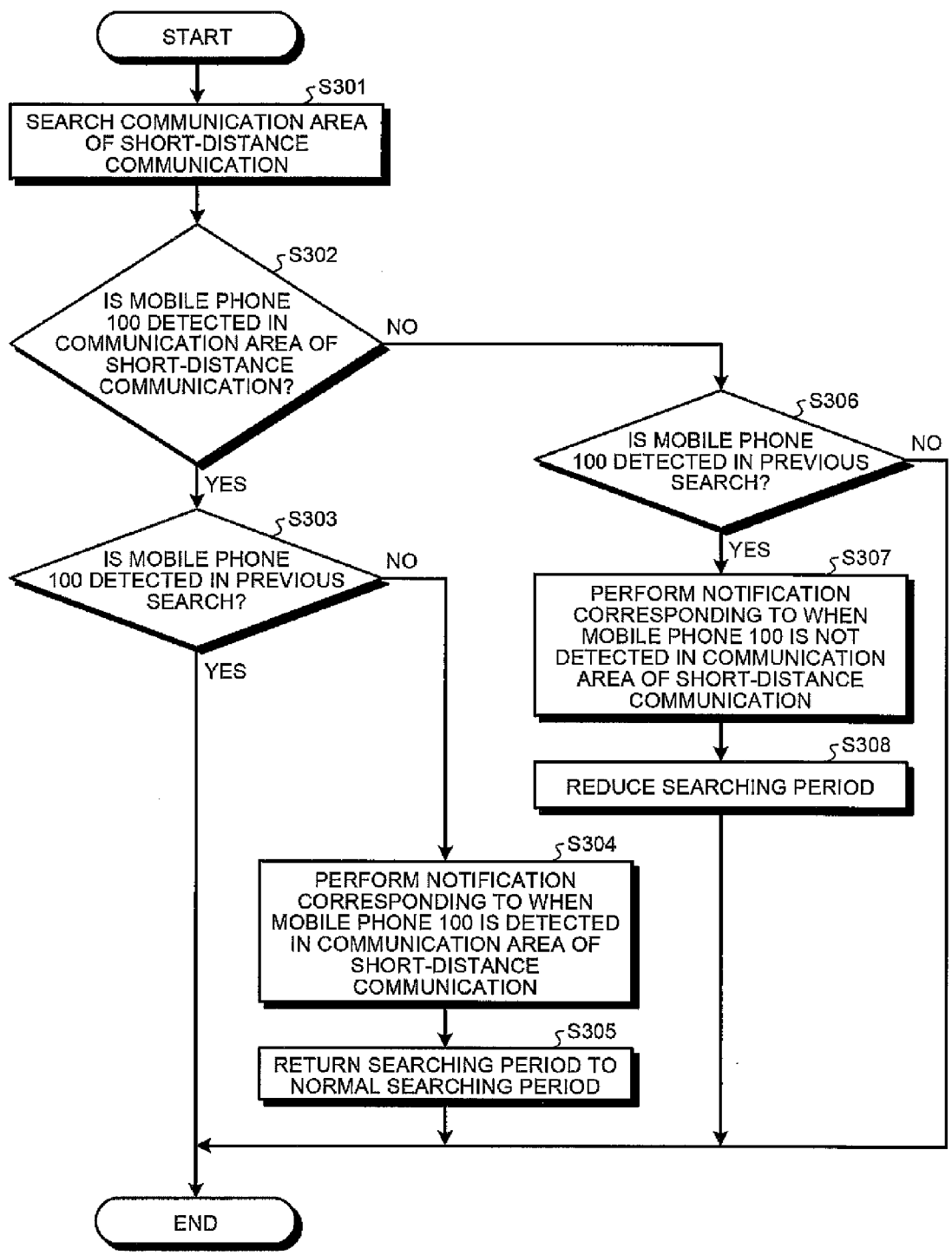
FIG. 9 is a schematic diagram illustrating one of some examples of a procedure of the processing by the mobile phone according to a fourth embodiment.

FIG. 9 is a schematic diagram illustrating one of some examples of the procedure of the processing by the mobile phone according to a fourth embodiment. The processing procedure illustrated in FIG. 9 is achieved by the controller 10 executing the control program 9A and the like stored in the storage 9.

As illustrated in FIG. 9, the controller 10 searches the communication area of the short-distance communication at Step S301. In the other words, the controller 10 searches for another device present in the communication area of the short-distance communication. Subsequently, the controller 10 determines whether the mobile phone 100 is detected in the communication area of the short-distance communication at Step S302.

When it is determined that the mobile phone 100 is detected in the communication area of the short-distance communication as a result of the determination (Yes at Step S302), then at Step S303, the controller 10 determines whether the mobile phone 100 is detected in the previous search.

When it is determined that the mobile phone 100 is detected in the previous search as a result of the determination (Yes at Step S303), the controller 10 ends the processing procedure illustrated in FIG. 9. When it is determined that the mobile phone 100 is not detected in the previous search as a result of the determination (No at Step S303), then at Step S304, the controller 10 performs the notification corresponding to when the mobile phone 100 is detected in the communication area of the short-distance communication. For example, the controller 10 displays the position checking message (refer to FIG. 3) on the display 2 or displays the position checking indicator 45 (refer to FIG. 6) on the display 2.

Subsequently, at Step S305, the controller 10 returns the searching period of another device in the communication area of the short-distance communication to a normal searching period. For example, the controller 10 returns the searching period to a normal polling period set as the default. Subsequently, the controller 10 ends the processing procedure illustrated in FIG. 9.

At Step S302, when it is determined that the mobile phone 100 is not detected in the communication area of the short-distance communication as a result of the determination (No at Step S302), then at Step S306, the controller 10 determines whether the mobile phone 100 is detected in the previous search.

When it is determined that the mobile phone 100 is detected in the previous search as a result of the determination (Yes at Step S306), then at Step S307, the controller 10 performs the notification corresponding to when the mobile phone 100 is not detected in the communication area of the short-distance communication. For example, the controller 10 displays the position checking message (refer to FIG. 4) on the display 2 or displays the position checking indicator 45 (refer to FIG. 7) on the display 2.

Subsequently, at Step S308, the controller 10 reduces the searching period of another device in the communication area of the short-distance communication. For example, the controller 10 reduces the searching period to a period shorter than the normal polling period set as the default. Subsequently, the controller 10 ends the processing procedure illustrated in FIG. 9.

At step S306, when it is determined that the mobile phone 100 is not detected in the previous search as a result of the determination (No at Step S306), the controller 10 ends the processing procedure illustrated in FIG. 9.

The processing procedure illustrated in FIG. 9 can also be applied to the processing procedure illustrated in FIG. 5. For example, the controller 10 reduces the searching period when the mobile phone 100 is not detected in the communication area of the short-distance communication while the controller 10 returns the searching period to the normal searching period when the mobile phone 100 is detected in the communication area of the short-distance communication.

In the fourth embodiment, the searching period of another device in the communication area of the short-distance communication is changed in accordance with a certain condition. For example, the searching period in the communication area of the short-distance communication is reduced when the mobile phone 1 turns from the state capable of performing the short-distance communication with the mobile phone 100 into the state incapable of performing the short-distance communication with the mobile phone 100 (when the mobile phone 100 is not detected in the communication area of the short-distance communication). This makes it possible to allow a user to promptly check the position of the child if the mobile phone 1 turns from the state incapable of performing the short-distance communication with the mobile phone 100 into the state capable of performing the short-distance communication with the mobile phone 100 (when the mobile phone 100 is detected again in the communication area of the short-distance communication).

Fifth Embodiment

For example, when one mobile phone fails to detect the mobile phone 100 in the communication area of its own short-distance communication, the mobile phone may inquire of another mobile phone as to whether it can detect the mobile phone 100.

Figure 10:
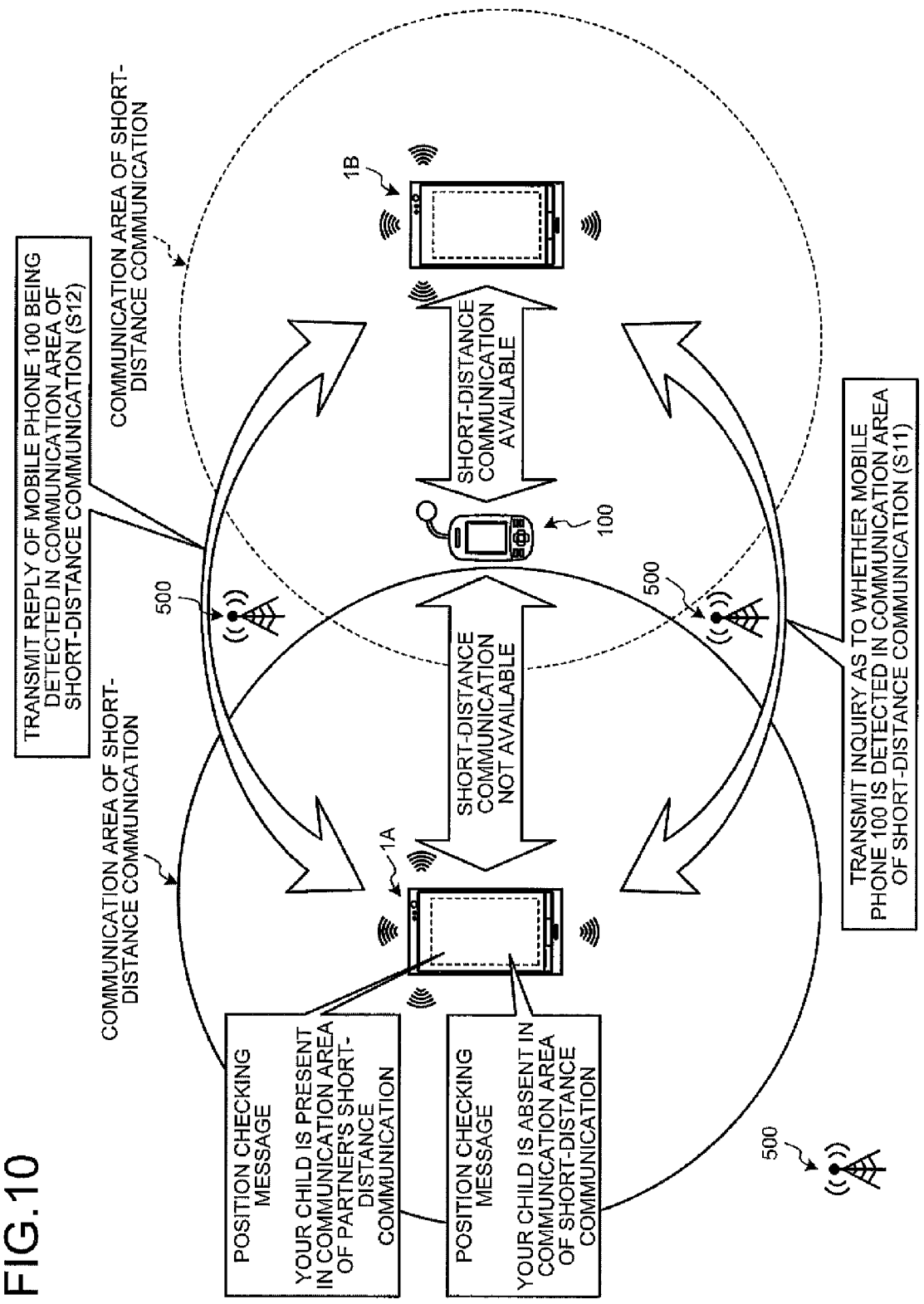
FIG. 10 is a schematic diagram illustrating an overview of processing of a position checking system according to a fifth embodiment.
Figure 11:
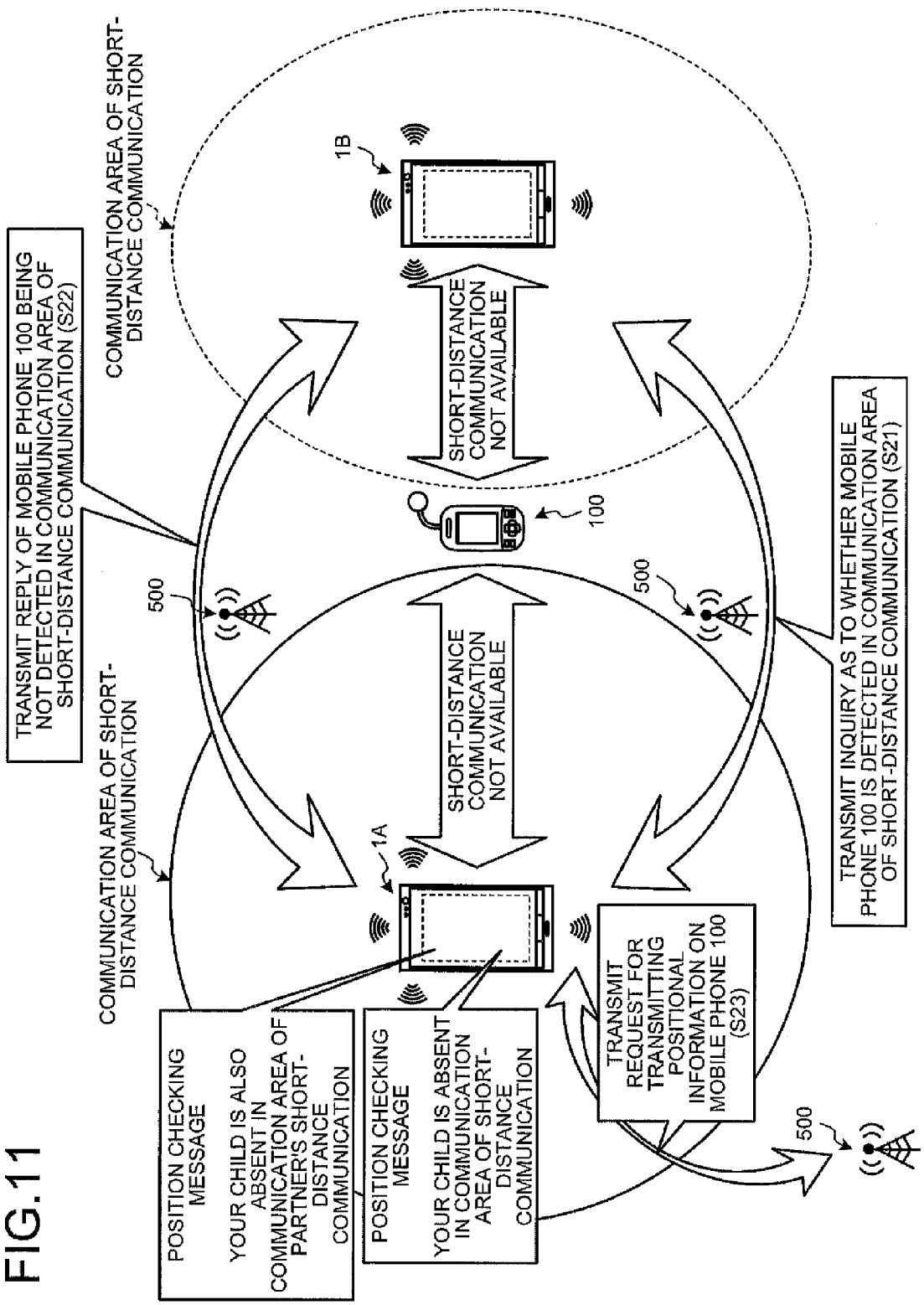
FIG. 11 is a schematic diagram illustrating an overview of the processing of the position checking system according to the fifth embodiment.

FIGS. 10 and 11 are schematic diagrams illustrating an overview of the processing of a position checking system according to a fifth embodiment. As illustrated in FIGS. 10 and 11, the position checking system according to the fifth embodiment includes a mobile phone 1A, a mobile phone 1B, the mobile phone 100, and a base station 500. The mobile phones 1A and 1B have the same functional structure as the mobile phone 1 illustrated in FIG. 1, for example.

For example, the father holds the mobile phone 1A, the mother holds the mobile phone 1B, and the child holds the mobile phone 100.

FIG. 10 illustrates an overview of the processing when the mobile phone 1A does not detect the mobile phone 100 in the communication area of the short-distance communication while the mobile phone 1B detects the mobile phone 100 in the communication area of the short-distance communication, for example.

As illustrated in FIG. 10, when not detecting the mobile phone 100 as a result of searching the communication area of its own short-distance communication, the mobile phone 1A transmits, to the mobile phone 1B, an inquiry as to whether the mobile phone 100 is detected in the communication area of the short-distance communication (Step S11).

When receiving the inquiry from the mobile phone 1A, the mobile phone 1B transmits, to the mobile phone 1A, a reply indicating that the mobile phone 100 is detected in the communication area of the short-distance communication (Step S12).

When receiving the reply from the mobile phone 1B, the mobile phone 1A displays the position checking message corresponding to the reply on the display 2. For example, as illustrated in FIG. 10, the mobile phone 1A displays a position checking message describing that "your child is present in communication area of partner's short-distance communication".

FIG. 11 illustrates an overview of the processing when both of the mobile phones 1A and 1B do not detect the mobile phone 100 in the communication area of the short-distance communication, for example.

As illustrated in FIG. 11, when not detecting the mobile phone 100 as a result of searching the communication area of its own short-distance communication, the mobile phone 1A transmits, to the mobile phone 1B, an inquiry as to whether the mobile phone 100 is detected in the communication area of the short-distance communication (Step S21).

When receiving the inquiry from the mobile phone 1A, the mobile phone 1B transmits, to the mobile phone 1A, a reply indicating that the mobile phone 100 is not detected in the communication area of the short-distance communication (Step S22).

When receiving the reply from the mobile phone 1B, the mobile phone 1A displays the position checking message corresponding to the reply on the display 2. For example, as illustrated in FIG. 11, the mobile phone 1A displays a position checking message describing that "your child is also absent in communication area of partner's short-distance communication". Subsequently, the mobile phone 1A transmits a request for transmitting the positional information on the mobile phone 100 (Step S23). At Step S23, the request for transmitting the positional information transmitted from the mobile phone 1A is received by the mobile phone 100 via the base station 500, for example.

Figure 12:
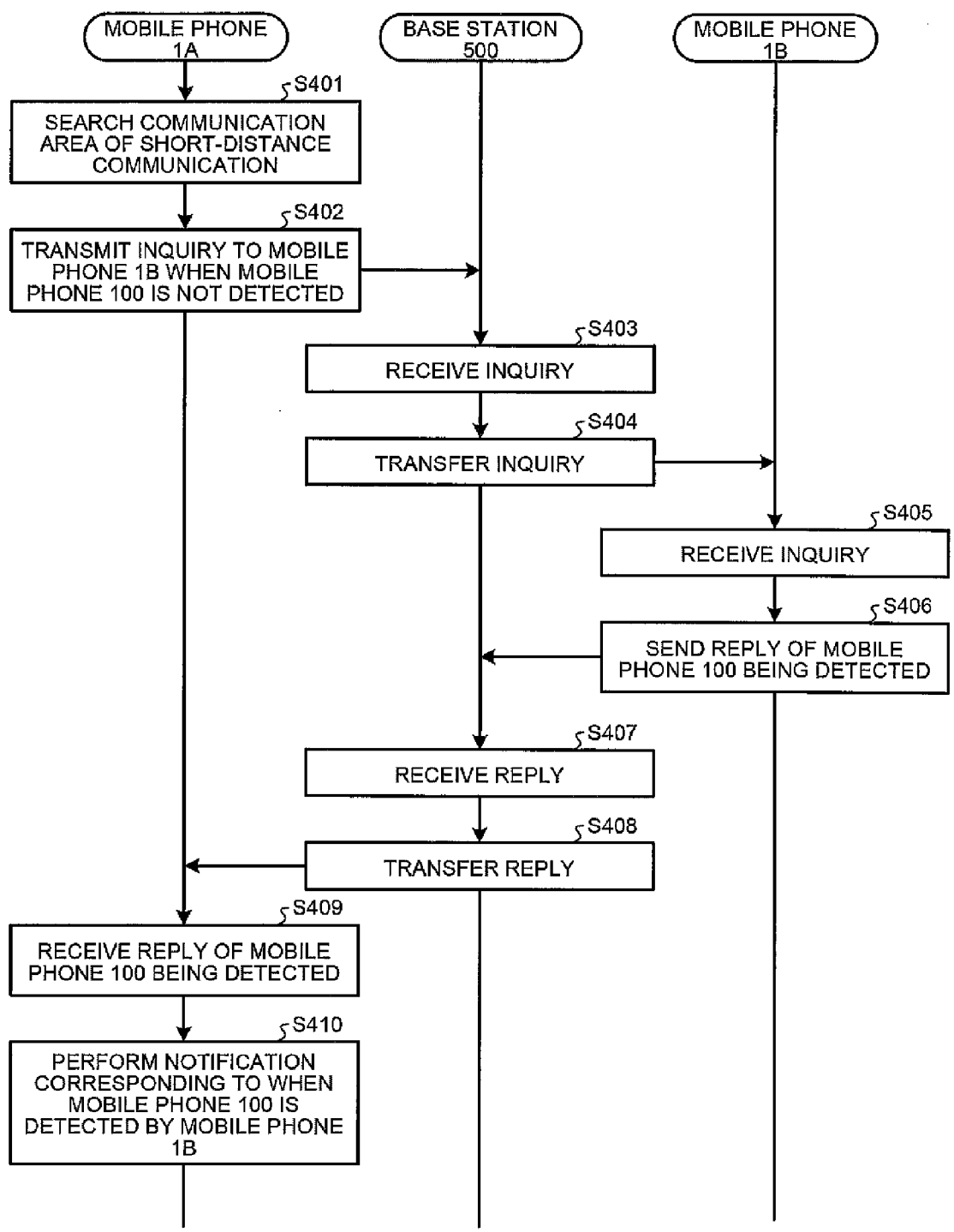
FIG. 12 is a schematic diagram illustrating one of some examples of a flow of the processing by the system according to the fifth embodiment.
Figure 13:
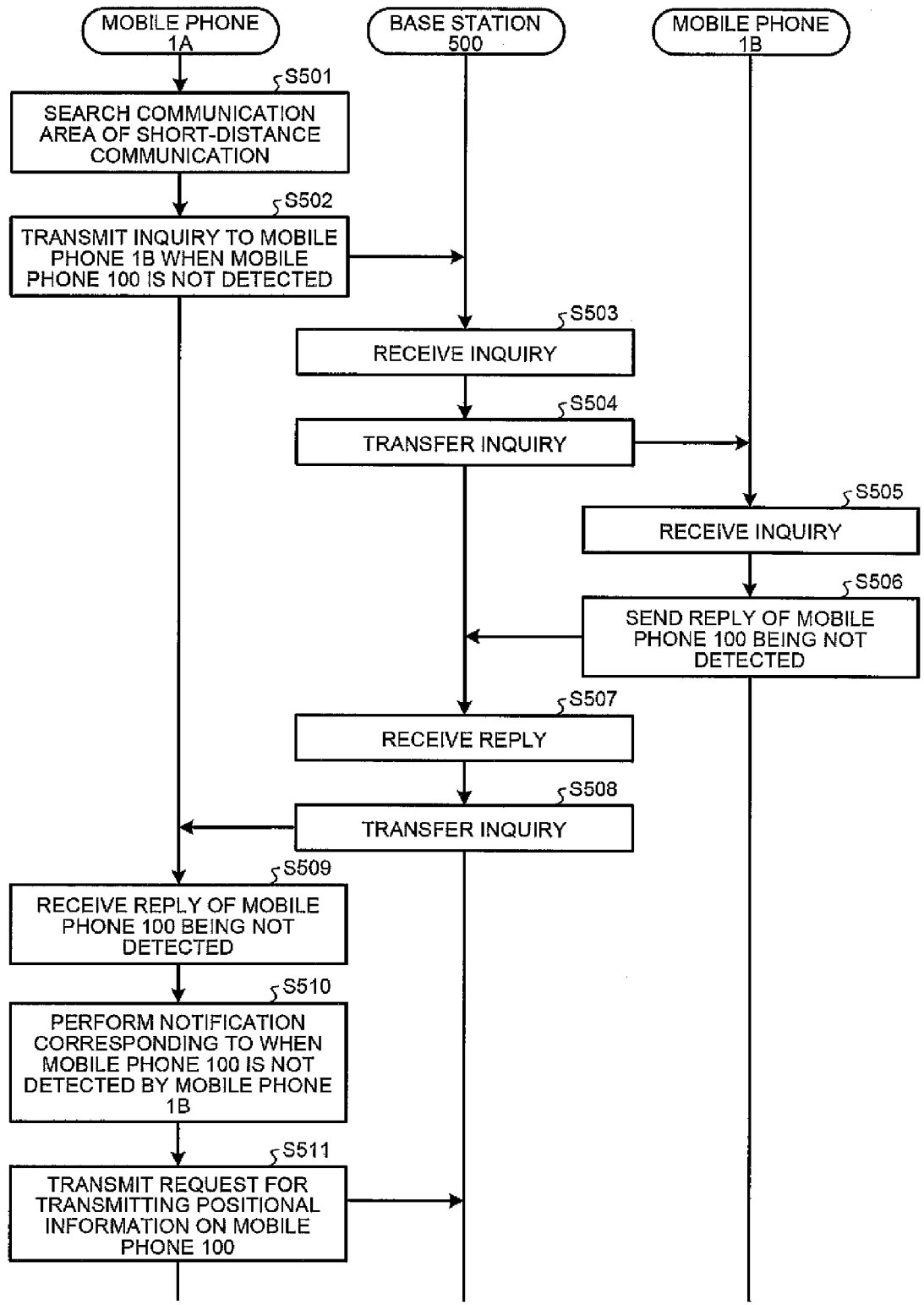
FIG. 13 is a schematic diagram illustrating one of some examples of the flow of the processing by the system according to the fifth embodiment.

FIGS. 12 and 13 are schematic diagrams illustrating examples of the processing by the system according to the fifth embodiment.

FIG. 12 illustrates a flow of the processing corresponding to FIG. 10. As illustrated in FIG. 12, the mobile phone 1A searches the communication area of the short-distance communication at Step S401. In the other words, the mobile phone 1A searches for another device present in the communication area of the short-distance communication. Subsequently, when not detecting the mobile phone 100 in the communication area of the short-distance communication, then at Step S402, the mobile phone 1A transmits, to the mobile phone 1B, an inquiry as to whether the mobile phone 100 is detected in the communication area of the short-distance communication.

When receiving the inquiry from the mobile phone 1A at Step S403, then at Step S404, the base station 500 transfers the inquiry from the mobile phone 1A to the mobile phone 1B.

When receiving the inquiry from the mobile phone 1A at Step S405, then at Step S406, the mobile phone 1B transmits, to the mobile phone 1A, a reply indicating that the mobile phone 100 is detected in the communication area of the short-distance communication.

When receiving the reply from the mobile phone 1B at Step S407, then at Step S408, the base station 500 transfers the reply from the mobile phone 1B to the mobile phone 1A.

When receiving the reply indicating that the mobile phone 100 is detected from the mobile phone 1B at Step S409, then at Step S410, the mobile phone 1A performs the notification corresponding to when the mobile phone 100 is detected by the mobile phone 1B (e.g., refer to FIG. 10).

FIG. 13 illustrates a flow of the processing corresponding to FIG. 11. As illustrated in FIG. 13, the mobile phone 1A searches the communication area of the short-distance communication at Step S501. In the other words, the mobile phone 1A searches for another device present in the communication area of the short-distance communication. Subsequently, when not detecting the mobile phone 100 in the communication area of the short-distance communication, then at Step S502, the mobile phone 1A transmits, to the mobile phone 1B, an inquiry as to whether the mobile phone 100 is detected in the communication area of the short-distance communication.

When receiving the inquiry from the mobile phone 1A at Step S503, then at Step S504, the base station 500 transfers the inquiry from the mobile phone 1A to the mobile phone 1B.

When receiving the inquiry from the mobile phone 1A at Step S505, then at Step S506, the mobile phone 1B transmits, to the mobile phone 1A, a reply indicating that the mobile phone 100 is not detected in the communication area of the short-distance communication.

When receiving the reply from the mobile phone 1B at Step S507, then at Step S508, the base station 500 transfers the reply from the mobile phone 1B to the mobile phone 1A.

When receiving the reply indicating that the mobile phone 100 is not detected from the mobile phone 1B at Step S509, then at Step S510, the mobile phone 1A performs the notification corresponding to when the mobile phone 100 is not detected by the mobile phone 1B (e.g., refer to FIG. 11).

Subsequently, the mobile phone 1A transmits a request for transmitting the positional information on the mobile phone 100 at Step S511. At Step S511, the request for transmitting the positional information transmitted from the mobile phone 1A is received by the mobile phone 100 via the base station 500, for example.

In the fifth embodiment, when one mobile phone (the mobile phone 1A) fails to detect the mobile phone 100 in the communication area of its own short-distance communication, the one mobile phone inquires of another mobile phone (the mobile phone 1B) as to whether it can detect the mobile phone 100, and receives a reply to the inquiry, for example. As a result, the user (e.g., the father) can promptly check that the child is detected in the communication area of the partner's (e.g., the mother) short-distance communication even if the child is not detected in the communication area of the user's short-distance communication.

Sixth Embodiment

In the fifth embodiment, when the mobile phones 1A and 1B are in the communication area of the short-distance communication, the inquiry and the reply described above may be performed using the short-distance communication without the base station 500, for example. As the short-distance communication, communication using the communication standard such as IEEE802.11, Bluetooth, or ZigBee can be used.

Figure 14:
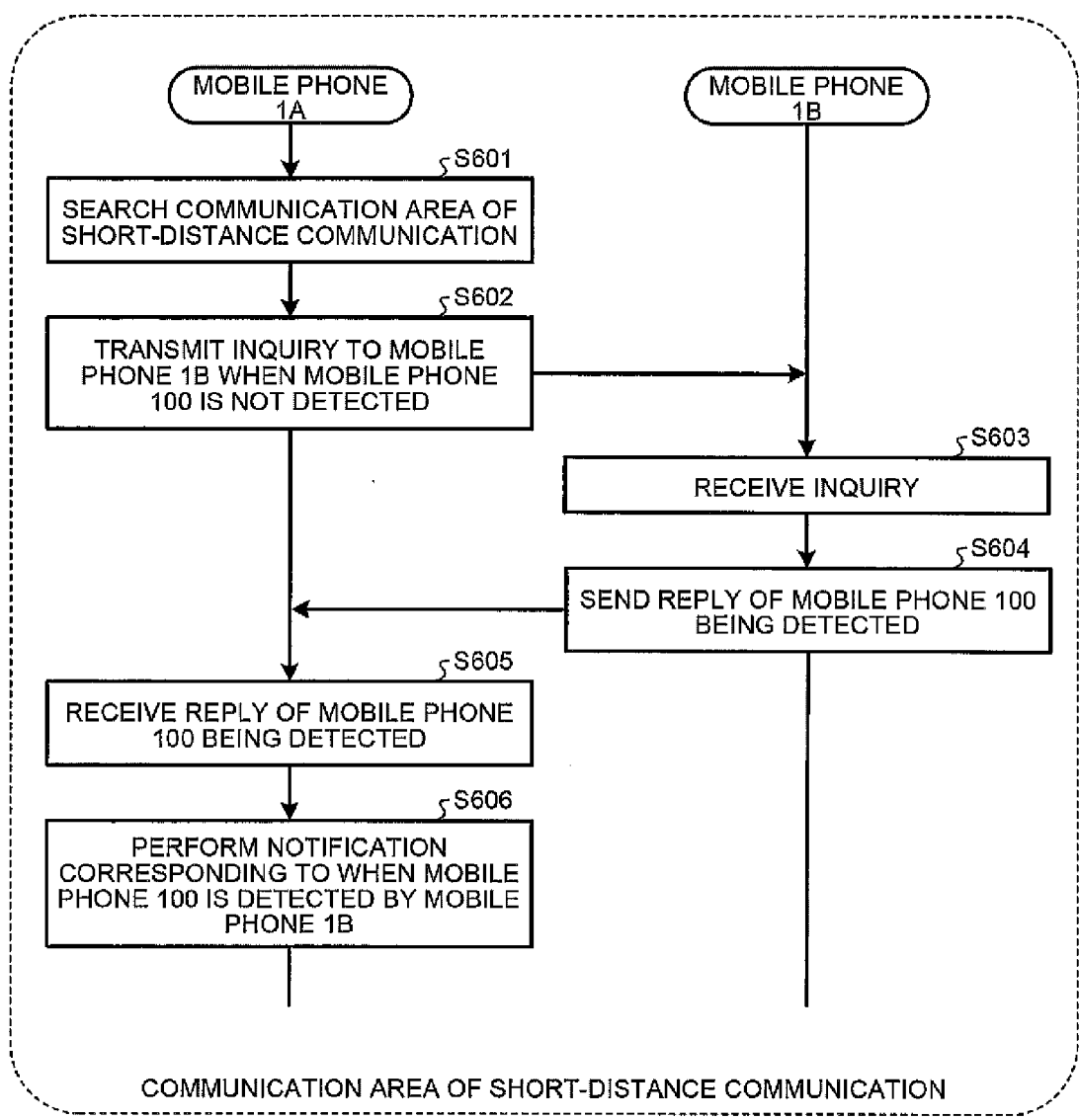
FIG. 14 is a schematic diagram illustrating one of some examples of a flow of the processing by the system according to a sixth embodiment.
Figure 15:
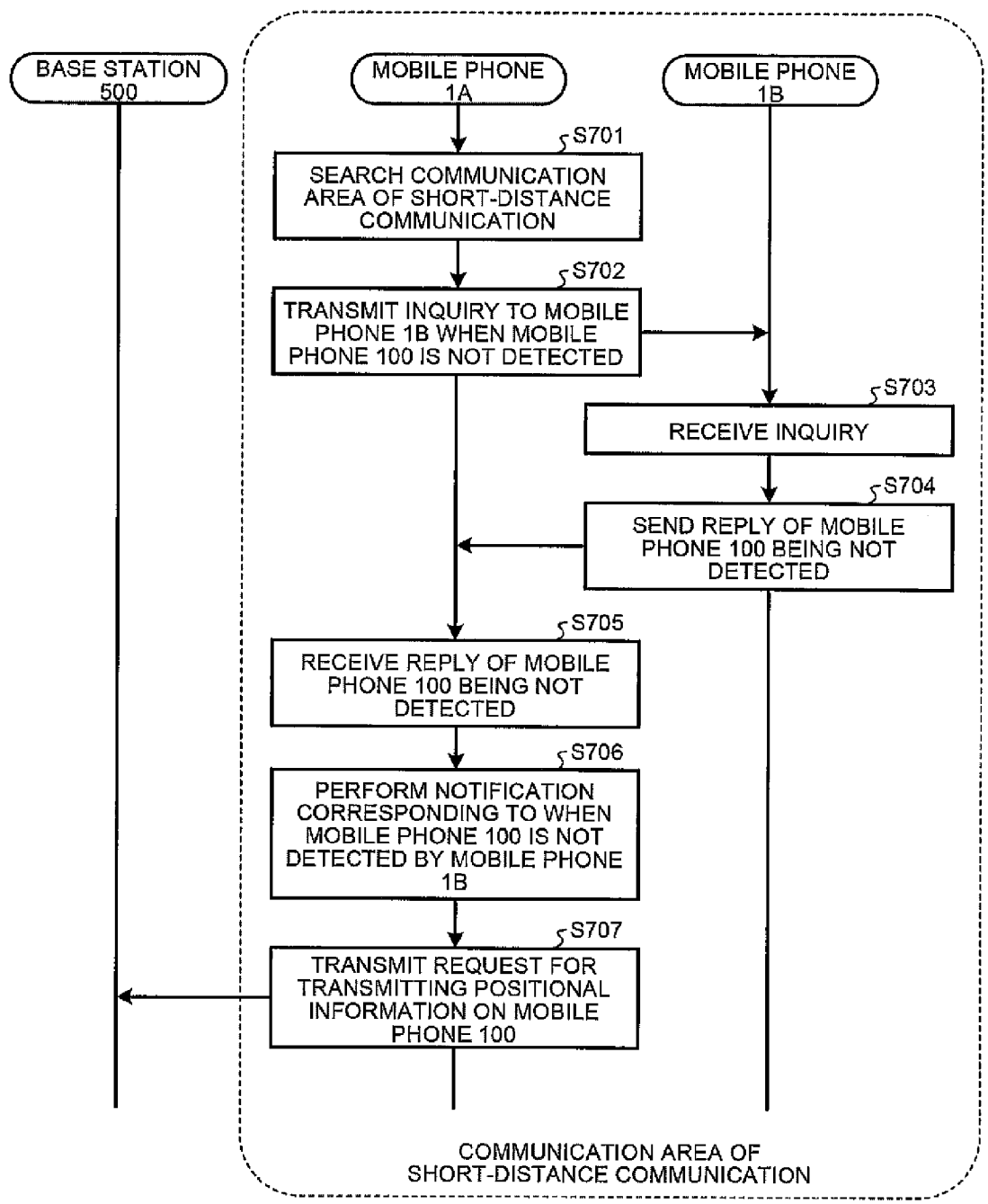
FIG. 15 is a schematic diagram illustrating one of some examples of the flow of the processing by the system according to the sixth embodiment.

FIGS. 14 and 15 are schematic diagrams illustrating examples of the processing by a system according to a sixth embodiment.

FIG. 14 illustrates a flow of the processing when the short-distance communication is used in the processing illustrated in FIG. 12. As illustrated in FIG. 14, the mobile phone 1A searches the communication area of the short-distance communication at Step S601. In the other words, the mobile phone 1A searches for another device present in the communication area of the short-distance communication. Subsequently, when not detecting the mobile phone 100 but detecting the mobile phone 1B in the communication area of the short-distance communication, then at Step S602, the mobile phone 1A transmits, to the mobile phone 1B using the short-distance communication, an inquiry as to whether the mobile phone 100 is detected in the communication area of the short-distance communication.

When receiving the inquiry from the mobile phone 1A at Step S603, then at Step S604, the mobile phone 1B transmits, to the mobile phone 1A using the short-distance communication, a reply indicating that the mobile phone 100 is detected in the communication area of the short-distance communication.

When receiving the reply from the mobile phone 1B at Step S605, then at Step S606, the mobile phone 1A performs the notification corresponding to when the mobile phone 100 is detected by the mobile phone 1B (e.g., refer to FIG. 10).

FIG. 15 illustrates a flow of the processing when the short-distance communication is used in the processing illustrated in FIG. 13. As illustrated in FIG. 15, the mobile phone 1A searches the communication area of the short-distance communication at Step S701. In the other words, the mobile phone 1A searches for another device present in the communication area of the short-distance communication. Subsequently, when not detecting the mobile phone 100 but detecting the mobile phone 1B in the communication area of the short-distance communication, then at Step S702, the mobile phone 1A transmits, to the mobile phone 1B using the short-distance communication, an inquiry as to whether the mobile phone 100 is detected in the communication area of the short-distance communication.

When receiving the inquiry from the mobile phone 1A at Step S703, then at Step S704, the mobile phone 1B transmits, to the mobile phone 1A using the short-distance communication, a reply indicating that the mobile phone 100 is not detected in the communication area of the short-distance communication.

When receiving the reply indicating that the mobile phone 100 is not detected from the mobile phone 1B at Step S705, then at Step S706, the mobile phone 1A performs the notification corresponding to when the mobile phone 100 is not detected by the mobile phone 1B (e.g., refer to FIG. 11).

Subsequently, the mobile phone 1A transmits a request for transmitting the positional information on the mobile phone 100 at Step S707. At Step S707, the request for transmitting the positional information transmitted from the mobile phone 1A is received by the mobile phone 100 via the base station 500, for example.

In the sixth embodiment, the inquiry as to whether the mobile phone 100 is detected in the communication area of the short-distance communication and the reply to the inquiry are performed between the mobile phones 1A and 1B using the short-distance communication. As a result, in the sixth embodiment, it can be more promptly checked that the child is detected in the communication area of the partner's (e.g., the mother) short-distance communication by the user's (e.g., the father) mobile phone even if the child is not detected in the communication area of the user's short-distance communication, than the fifth embodiment because the base station 500 is not used.

In some embodiments, the mobile phone has been explained as one of some examples of the device according to the appended claims; however, the device according to the appended claims is not limited to the mobile phone. The device according to the appended claims may be a mobile electronic device other than the mobile phone. Examples of the mobile electronic devices include, but are not limited to, tablets, mobile personal computers, digital cameras, media players, electronic book readers, navigators, and gaming devices.

Although the art of appended claims has been described with respect to some specific embodiments for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A mobile electronic device, comprising:
   a communication unit configured to perform short-distance communication with a first device;
   a notification unit configured to perform a local notification for a user of the mobile electronic device; and
   a controller configured to, when the short-distance communication with the first device is incapable of being performed,
      cause the notification unit to perform the local notification to the user, and
      transmit, to a second device, an inquiry as to whether the short-distance communication between the first device and the second device is capable of being performed.

2. The mobile electronic device according to claim 1, wherein,
   when a state incapable of performing the short-distance communication with the first device returns to a state capable of performing the short-distance communication with the first device,
      the controller is configured to perform a notification to the user.

3. The mobile electronic device according to claim 1, wherein,
   when receiving, from the second device, an inquiry as to whether the short-distance communication between the mobile electronic device and the first device is capable of being performed,
      the controller is configured to transmit, to the second device, a reply whether the short-distance communication between the mobile electronic device and the first device is capable of being performed.

4. The mobile electronic device according to claim 1, wherein,
   when the short-distance communication with the first device is incapable of being performed,
      the controller is configured to transmit, to the first device, a request for transmitting positional information of the first device.

5. The mobile electronic device according to claim 1, wherein the notification unit comprises at least one of
   a display configured to display at least one of a message and an image as the local notification, and
   a speaker configured to generate a sound as the local notification.

6. A position checking method that is implemented by an electronic device including a communication unit and a notification unit, the position checking method comprising:
   performing, by the communication unit, short-distance communication with a first device; and
   when the short-distance communication with the first device is incapable of being performed,
      performing, by the notification unit, a local notification to a user of the electronic device, and
      transmitting, to a second device, an inquiry as to whether the short-distance communication between the first device and the second device is capable of being performed.

7. A non-transitory storage medium that stores a position checking program that causes, when executed by an electronic device including a communication unit and a notification unit, the electronic device to execute:
   performing, by the communication unit, short-distance communication with a first device; and
   when the short-distance communication with the first device is incapable of being performed,
      performing, by the notification unit, a local notification to a user of the electronic device, and
      transmitting, to the first device, a request for transmitting positional information of the first device.

8. A position checking system, comprising:
   a first device;
   a second device;
   a third device; and
   a base station, wherein
   the first device is configured to
      transmit, to the second device through communication via the base station or short-distance communication, an inquiry as to whether short-distance communication between the second device and the third device is capable of being performed when the short-distance communication between the first device and the third device is incapable of being performed, and
      transmit, to the second device through communication via the base station or short-distance communication, a reply whether the short-distance communication between the first device and the third device is capable of being performed when receiving an inquiry as to whether the short-distance communication between the first device and the third device is capable of being performed from the second device, and
   the second device is configured to
      transmit, to the first device through communication via the base station or short-distance communication, an inquiry as to whether short-distance communication between the first device and the third device is capable of being performed when the short-distance communication between the second device and the third device is incapable of being performed, and transmit, to the first device through communication via the base station or short-distance communication, a reply whether the short-distance communication between the second device and the third device is capable of being performed when receiving an inquiry as to whether the short-distance communication between the second device and the third device is capable of being performed from the first device.

\* \* \* \* \*